Feb. 28, 1933.  W. J. WALSH  1,899,740
AUTOMOBILE HEADLIGHT
Filed April 29, 1931
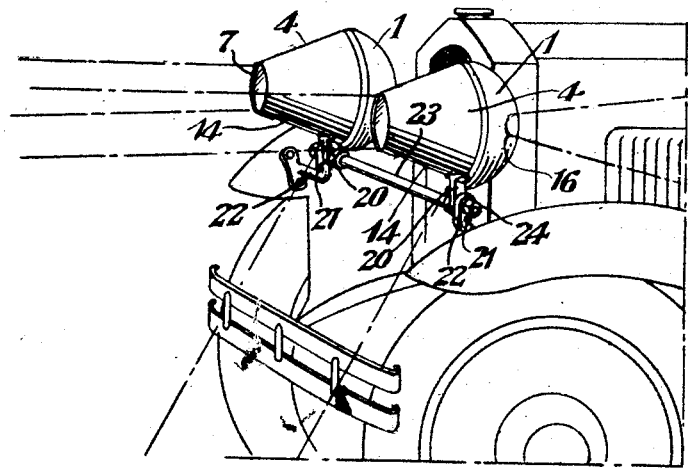
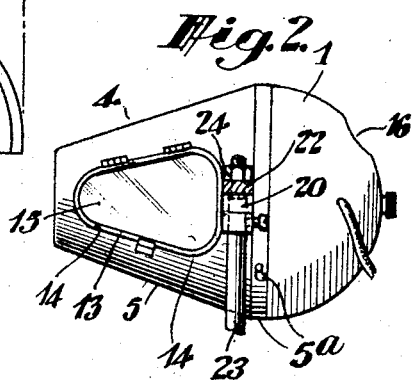
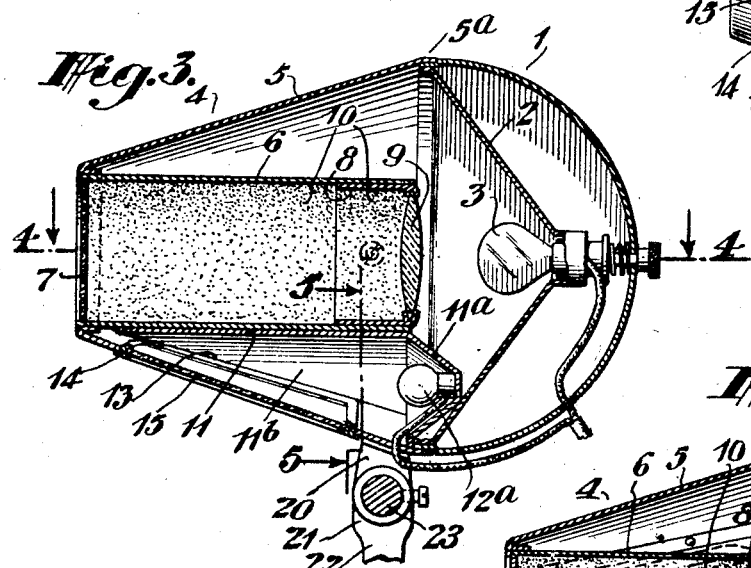
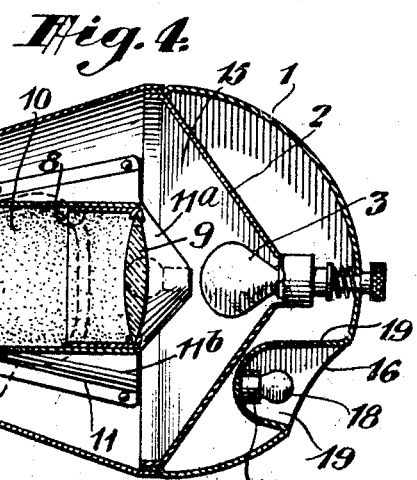
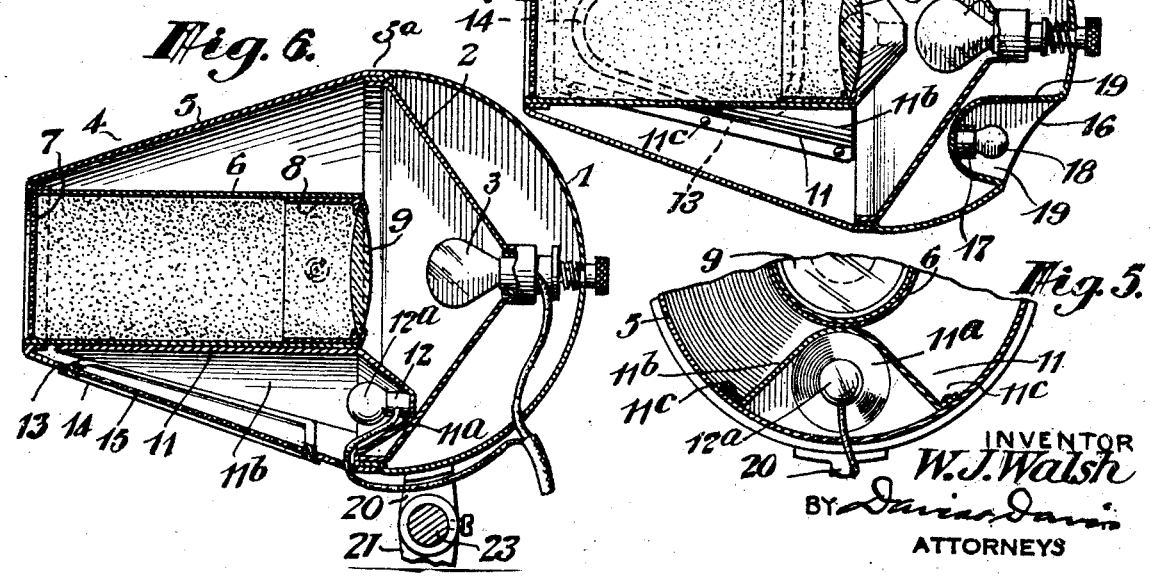

Patented Feb. 28, 1933

1,899,740

UNITED STATES PATENT OFFICE

WILLIAM J. WALSH, OF JERSEY CITY, NEW JERSEY

AUTOMOBILE HEADLIGHT

Application filed April 29, 1931. Serial No. 533,585.

Important objects of the present invention are, to provide a generally improved vehicle headlight; to provide a vehicle headlight designed to properly illuminate the path of the vehicle and prevent a blinding effect upon a person approaching and passing the vehicle upon the road; to provide a headlight with improved means to direct light rays straight ahead and prevent lateral dispersion in a manner to prevent side glare and blinding effect upon the driver of an approaching and passing vehicle; to provide such a headlight with improved means for illuminating the road immediately in front of the vehicle; to provide such a headlight with means for casting illumination to the rear in a manner to illuminate the side of the vehicle while shielding the driver from the rays; to provide improved lateral glare-preventing means designed for attachment to a standard automobile headlight; and to provide an automobile headlight with other improved features of design to be described hereinafter.

In the drawing,

Fig. 1 is a front view of an automobile provided with a pair of my improved headlights;

Fig. 2 a bottom plan view of one of the headlights;

Fig. 3 a vertical longitudinal sectional view of one of the headlights upon a large scale;

Fig. 4 a horizontal section taken on the line 4—4 of Fig. 3;

Fig. 5 a detail vertical section taken on the line 5—5 of Fig. 3; and

Fig. 6 a view similar to Fig. 3 showing a modification of the headlight structure.

The headlight structure comprises a body including a bowl-like rear casing section 1. Mounted in said casing section is a concave reflector 2 whose outer edge is joined to the forward edge of the section. At the center of the reflector is an electric lamp 3 which projects forward from the reflector. Said rear casing section, reflector and lamp form a headlight body of standard, or substantially standard form. Mounted in front of said body is my improved means designated 4 as a whole for directing the rays transmitted from said lamp and reflector forward and preventing side glare, and for directing illumination from another source downward and forward upon the road immediately in front of the automobile.

This light-directing means 4 includes a front casing section 5 of frusto-conical form having its larger end detachably connected to the forward edge of the bowl-like rear section 1, as at 5ª. In the present instance the releasable connection between said sections is of the bayonet slot type, but this detail may be varied. Mounted within the frusto-conical section is a tubular ray director 6 of material length and uniform, or substantially uniform, cross section. At its forward end the tube 6 is joined to the smaller end of the frusto-conical section and opens through it. The rear end of the tube is spaced forward from the lamp 3 and is approximately in the plane of the rear end of the frusto-conical section. Said section supports the tube centered with respect to the lamp and extending straight forward from it. A transparent glass disk 7 covers the forward end of the tube and, telescoped within the rear end of the tube, is a short tubular section 8 bearing a lens 9, preferably a double convex one. Lens 9 is adjustable toward and from the lamp 3 by sliding the tubular section 8, to focus the rays from the lamp and the reflector, and the adjustments may be maintained by a set screw threaded through tube 6 and engaging the lens-bearing section. A black light-absorbing coating 10 lines the interior of the tube 6 and the telescoping section 8. The tube 6 and the section 5 may be made of sheet metal parts joined together, or they may be formed integrally.

Within the casing section 5, directly beneath director 6 is a forwardly and downwardly directed reflector 11 comprising a conical rear portion 11ª and an elongated downwardly opening hood portion 11ᵇ extending forward from the edge of the conical portion. Said conical portion 11ª fits into the reflector 2. The hood portion 11ᵇ fits against the under side of the director and its lower edges are inclined and formed with outturned flanges fitting against the interior of the casing section 5 and secured as at 11ᶜ.

The conical reflector portion 11ª bears a central lamp socket 12 in which is mounted an electric lamp 12ª. An elongated aperture 13 is formed in the casing section 5 in register with the hood opening, and a door 14 closes said aperture and has a transparent glass panel 15. In the present instance the door is hinged at one edge and has a catch for holding it closed. It may be shiftably mounted in any suitable manner however to render the lamp 12ª accessible. Due to the forward and upward inclination of the under side of casing section 5 the aperture 13 and the transparent panel are directed slightly forward as well as downward.

The bowl-like rear casing section 1 is formed with a rearwardly opening recess 16 located back of the reflector 3 and spaced laterally outward from the center thereof. Within said recess is a lamp socket 17 forming a mounting for an electric lamp 18. The walls 19 of the recess form a substantially parabolic reflector disposed to direct rays from the lamp 18 rearward and laterally outward for illuminating the side of the automobile including the running board, while shielding the occupants of the automobile from illumination. Preferably the lamps 12ª and 18 are materially less powerful than lamp 3, and the current for the three lamps is independently controlled for lighting and extinguishing each lamp independently of the others.

In the form of the invention shown in Figs. 1 to 5 inclusive the entire headlight is supported as a unit through the medium of the front light-directing means 4. For this purpose the frusto-conical casing section 5 has a pivot ear 20 at its under side fitted against an ear 21 borne by a bracket 22 suitably mounted upon the automobile. The ears 20 of the two lamps are fixed to a cross rod 23. This rod has reduced threaded ends extending through the bracket ears, and clamping nuts 24 are screwed thereon. The headlights may be tilted to different vertical angles and clamped in a properly adjusted position by the nuts. The mounting of the headlights may be varied however.

In the form of the invention shown in Fig. 6 the entire headlight is supported through the medium of the rear casing which in this case has the supporting ear 20 directly attached to it. The front light-directing section of the headlight may then be attached to or removed from the body of the lamp section without disturbing the mounting of the latter. Also said section 4 may be mounted upon a standard headlight with no change in the headlight except the removal of its lens. In both forms of the invention the telescoping section 8 and the lens 9 may be omitted if desired. Said section is freely removable from the tube 6 upon release of its set screw.

My improved headlight effectually prevents side glare. The long, non-reflecting tubular light director 6 directs the rays transmitted from lamp 3 and the reflector 2 straight forward for a material distance along the road. As a motorist or pedestrian approaches an automobile equipped with such headlights and steers aside for passing he entirely avoids the forwardly directed beams from the headlights so that blinding effect and consequent confusion in passing is prevented. At the same time the automobile equipped with these headlights has its path immediately in front illuminated by the rays directed downward and forward from lamps 12ª in a manner to entirely avoid glare. In driving upon illuminated city streets the main lamps 3 may be extinguished and the lamps 12ª may be used alone. They have sufficient front illumination to serve as dimmer lights. Each headlight embodies in a single unit means for straight ahead illumination, means for downward illumination and means for rearward and lateral illumination.

What I claim is:

1. A unit for mounting in front of a headlight comprising a substantially horizontal tubular light director to direct a beam of light forward from the headlight and limit lateral dispersion, means forming a compartment at the under side of said director and including a reflector having a forwardly facing rear portion and a horizontally elongated downwardly facing portion extending forward from said rear portion, a lamp mounted in said compartment in a position to have its rays directed forward and downward by the reflector, the compartment having an aperture at its under side for passage of the rays from said lamp and reflector forward and downward, a door for said aperture having a transparent panel, all of said elements being joined together in the unit, and means to detachably connect the unit to the headlight.

2. A unit for mounting in front of a headlight comprising a substantially horizontal tubular light director to direct a beam of light forward from the headlight and limit lateral dispersion, means forming a compartment at the under side of said director and including a downwardly and forwardly facing reflector, a lamp mounted in said compartment in a position to have its rays directed forward and downward by the reflector, the compartment having an aperture at its under side for passage of the rays from said lamp and reflector forward and downward, all of said elements being joined together in the unit, and means to detachably connected the unit to the headlight.

In testimony whereof I hereunto affix my signature.

WILLIAM J. WALSH.